April 23, 1968   W. E. LOWREY   3,379,408

ECCENTRIC PLUG VALVE

Filed Feb. 8, 1965   2 Sheets-Sheet 1

INVENTOR.
WILLIAM E. LOWREY
BY
*James L. Jackson*
AGENT

April 23, 1968  W. E. LOWREY  3,379,408
ECCENTRIC PLUG VALVE
Filed Feb. 8, 1965  2 Sheets-Sheet 2

INVENTOR.
WILLIAM E. LOWREY
BY
*James L. Jackson*
AGENT

United States Patent Office 3,379,408
Patented Apr. 23, 1968

3,379,408
ECCENTRIC PLUG VALVE
William E. Lowrey, Houston, Tex., assignor to ACF Industries Incorporated, New York, N.Y., a corporation of New Jersey
Filed Feb. 8, 1965, Ser. No. 430,846
8 Claims. (Cl. 251—299)

ABSTRACT OF THE DISCLOSURE

A rotary plug valve having a trunnioned plug member having a partially spherical surface which is generated eccentrically with respect to the trunnions of the plug and which engages a valve seat also generated eccentrically with respect to the trunnions. A sealing member of generally triangular cross section is retained with a groove in the plug member and is adapted to move directly into engagement with the valve seat upon closing of the valve.

---

This application is directed generally to valves and more particularly to new and useful improvements in rotary valves for controlling the flow of fluids, including slurries.

It has been found through considerable development in valves for controlling the flow of slurries and other fluid ladings, that a type of valve, generally known in the industry as an eccentric plug valve, is frequently considered the most practical type of valve for this type of service. Eccentric plug valves are generally composed of a valve body having a pair of aligned trunnion bores located eccentrically with respect to the flow passages of the valve body. A plug member, having a pair of either integral or interconnected trunnions which fit within aligned bores, is positioned for rotation within the valve chamber of the valve and includes an eccentric portion which is rotatable from the position closing one of the flod passages to a position allowing the flow of fluid through the valve. A particular advantage in eccentric plug valves resides in the ability of the plug member, since it is eccentric, to move into substantially direct sealing engagement with the seat or sealing surface of the valve, thereby preventing any substantial dragging of the sealing surface of the plug across the valve seat during the opening or closing movements.

It has been found that eccentric plug valves, which include plug members having a coating of elastomer material molded thereabout, have extremely good sealing characteristics, especially in slurry service. Since slurries are solid materials which are suspended within a liquid carrier, valves which incorporate metal-to-metal sealing are not generally satisfactory for the handling of slurries. The solid material of the slurry will become trapped between the metal sealing surfaces, thereby preventing proper seating between the metal sealing surfaces. If an elastomeric material is employed as one of the sealing surfaces, it will tend to envelope the entrapped solid particles of the slurry against the metal sealing surface by deforming itself thereabout. This is generally known in the industry as forming a bubbletight seal, because the elastomer material will prevent virtually any fluid from flowing past the seat.

Eccentric plug valves which have a coating of elastomeric material formed about the eccentric plug for engagement with a metal seat, have a number of serious disadvantages even though they are widely used in slurry service. Frequently the slurries, which are controlled by plug valves, contain solid materials having jagged or sharp edges, thereby making the slurry quite abrasive to the valve surfaces. Since a portion of a fully coated plug member is always in contact with the lading flow, even though the sealing surface of the plug may be positioned out of direct contact with the turbulent fluid, the exposed portion of the elastomer plug coating is subject to wear by the abrasive slurry. After the exposed portion of the plug coating has been worn away to the metal by the abrasive lading, the coating may become loosened from the metal portion of the plug and the sealing surface of the plug may become distorted to the point that an adequate seal is impossible.

Plug valves which are completely lined with resilient material are also limited to low pressure service because the forces produced by turbulent high pressure fluid as it passes through the valve would tend to tear the elastomer material from the valve surfaces.

Another disadvantage in the use of plug valves having completely coated plugs is that the entire plug must be replaced when the elastomer coating wears or otherwise deteriorates to the point that an adequate seal cannot be developed between the valve and the sealing surface. Accordingly, it is a primary object of this invention to provide an eccentrically mounted rotatable or rotary plug valve, having sealing members which may be easily replaced.

It is a further object of this invention to provide a novel eccentric plug valve which is adapted for both high and low pressure service with either liquids or slurries.

It is an even further object of this invention to provide a novel rotary eccentric plug valve incorporating a resilient sealing member which is moved out of direct contact with the lading flow in the open position of the valve.

An even further object of this invention contemplates the provision of a novel rotary plug valve incorporating a resilient sealing member which is moved substantially into direct contact with the seal of the valve, thereby preventing wear or erosion of the sealing face of the resilient sealing material during opening or closing of the valve.

It is among the several objects of this invention to provide a novel rotary plug valve, incorporating a specific seat construction which might employ sealing members composed of any one of a number of different materials to adapt the valve for the specific service conditions.

These and other objects of the invention will be apparent to persons skilled in the art from a study of the following description and accompanying drawings in which.

Briefly, the invention involves a plug valve having an eccentrically positioned rotary plug member having a generally spherical sealing surface thereon and incorporating a substantially resilient sealing member which is contained within a groove formed in the sealing surface of the plug member. An annular portion of the sealing member extends slightly beyond the spherical surface of the plug and is adapted for sealing engagement with sealing surfaces formed within the valve body. The sealing member structure and the plug construction defining the sealing member groove is so designed that the sealing member will have adequate sealing engagement with the sealing surfaces of the valve and yet will be positively retained within the groove against the possibility of being forced from its groove by the fluid controlled by the valve. The plug includes retainer structure which overlies a portion of the sealing member and positively retains the sealing member within its groove.

Figure 1:
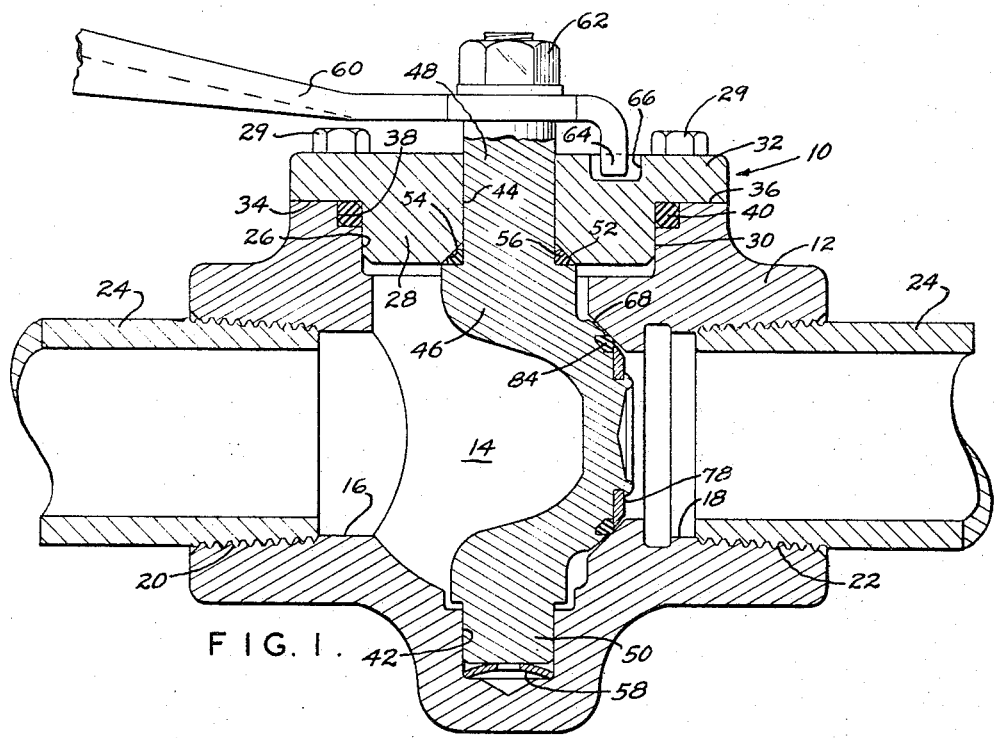
FIGURE 1 is an elevational view in section illustrating a valve construction incorporating this invention.
Figure 2:
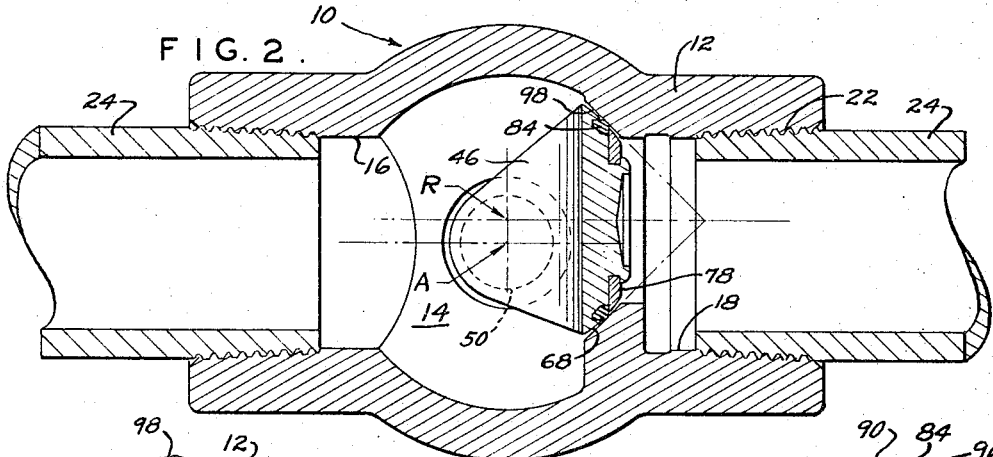
FIGURE 2 is a plan view in section of the invention of FIGURE 1.

Referring now to the drawings for a more detailed description of the invention, as illustrated in FIGURES 1 and 2, the invention involves a valve 10 formed with a valve body 12, having a valve chamber 14 defined therein. A pair of flow passages 16 and 18 are formed in the valve body and communicate with the valve chamber 14 to allow the flow of fluid through the valve. The flow passages 16 and 18 of the valve body 12 may be internally threaded, as illustrated at 20 and 22 respectively, for connection of the valve 10 to the external threads of a pipeline 24. Other means of connection of the valve to a pipeline, such as welded or flanged connection, might be employed without altering the spirit or scope of this invention. The valve body 12 is formed with an enlarged bore 26 disposed in generally transverse relation with the flow passages 16 and 18, which defines an opening into the valve chamber 14. A bonnet member 28, which is removably fixed to the body 12 by a series of screws 29, is formed with a closure portion 30 of slightly smaller diameter than the bore 26 and fitting within the bore 26, thereby forming a closure for the valve chamber. The bonnet 28 is formed with an annular flange 32, having an annular substantially planar surface 34, which is engageable with an annular substantially planar shoulder surface 36, formed on the valve body 12 about the opening 26, to position the closure portion 30 within the bore 26. An annular seal groove 38 is defined in the valve body 12 by an enlarged bore, and retains a resilient O-ring type sealing member 40 in compression within the groove 38 to establish a fluidtight seal between the bonnet 28 and the valve body 12.

The valve body 12 and the bonnet 28 are formed respectively with aligned trunnion bores 42 and 44, which are positioned centrally of the valve chamber 14. A plug member 46 is rotatably positioned within the valve chamber 14 and includes upper and lower aligned trunnions 48 and 50, which are received respectively within the bores 44 and 42. An annular shoulder 52, on the plug member 46 formed about the trunnion 48, cooperates with a frusto-conical surface 54 formed on the bonnet 28 about the bore 44 to define an annular chamber of generally triangular cross section, which retains an O-ring type resilient sealing member 56 for the establishment of a seal between the trunnion 48 and the bonnet 28. Pressure wtihin the valve tending to exit the valve chamber along the valve stem, will force the O-ring 56 into the upper portion of the triangular shaped chamber, thereby effecting a tighter seal. In effect the pressure as it increases, increases the sealing ability of the O-ring 56. A spring member 58, which may be a Belleville washer, is positioned at the lower extremity of the bore 42 and serves to bias the plug member 46 in a direction toward the bonnet 28, thereby maintaining the shoulder 52 of the plug in sealing engagement with the O-ring member 56. A handle member 60 is fixed to a threaded portion of the trunnion 48 by a nut 62 and includes a stop portion 64 which is disposed within an arcuate groove 66 in the bonnet 28 and which serves to limit rotation of the handle 60 to a rotation of substantially 90°. The stop portion 64 o fthe handle 60 also serves as a position indicator to indicate the position of the plug member 46 within the valve chamber 14.

Figure 3:
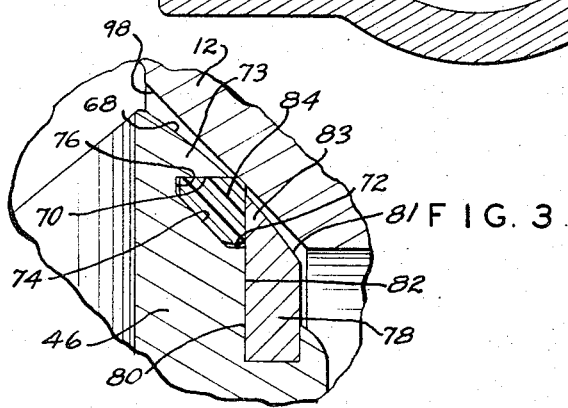
FIGURE 3 is a partial sectional view of the valve of FIGURE 1, illustrating the sealing structure in greater detail.

Referring now to FIGURES 1 and 2, and in particular FIGURE 3, and forming an important part of this invention, the plug member 46 is formed with an annular seal groove which is cut or otherwise formed into the generally spherical surface 68. The specific configuration of the groove is formed by a pair of spaced generally cylindrical surfaces 70 and 72, a generally frusto-conical surface 74 and a radial surface 76, which is disposed in generally right angular relationship with the cylindrical surface 70. The frusto-conical surface 74 defines the bottom wall of the groove. The radial surface 76 and the cylindrical surface 72 to define the side walls of the groove. The cylindrical surface 70 intersects the spherical surface 68 to define an exterior peripheral lip 73. A retainer member 78, having a substantially planar annular surface 80, is maintained against an annular planar surface 82 formed on the plug member 46 and defines an interior peripheral lip 83 which cooperates with the exterior peripheral lip 73 to define a restricted opening into the groove. A beveled partially spherical surface 81 on the retainer 78 forms a continuation of the partially spherical surface 68.

Figure 4:
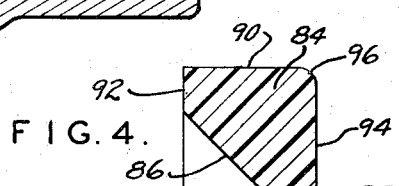
FIGURE 4 is an enlarged section of the sealing member of FIGURE 1.

A generally circular sealing member 84 is disposed within the seal groove and is locked within the groove by the retainer member 78. As illustrated in FIGURE 4 in its uncompressed condition, the sealing member 84 is formed with a substantially conical or frusto-conical base surface 86, inner and outer cylindrical surfaces 88 and 90 respectively, a circular generally planar radial rear surface 92, and a substantially planar annular face surface 94. The exterior peripheral surface 90 and the face surface 94 have an included angle of substantially 90° and are joined by a curved sealing surface 96. When the sealing member 84 is positioned within the seat groove in the plug 46, the annular sealing surface 96 will protrude through the restricted opening and slightly beyond the spherical surfaces 68 and 81. The base surface 86 of the sealing member 84 will be in tight engagement with the bottom wall 74 of the groove. The cylindrical surface 70, defining the exterior peripheral wall of the groove, and the planar surface 80 of the retainer 78, will be maintained in tight engagement with the surfaces 90 and 94 respectively of the sealing member 84, thereby maintaining the sealing member under compression within the groove. The surfaces 88 and 92 of the sealing member 84 will be spaced from their opposing surfaces 72 and 76 of the groove, and when under compression the surfaces 88 and 92 will be slightly distorted, as illustrated in FIGURE 3.

As illustrated in FIGURE 2 and forming an important part of this invention, the point of radius R from which the spherical or conical surface 68 is generated, is positioned eccentrically with respect to the axis A of the trunnions 48 and 50. The valve body 12 is formed with a substantially frusto-conical sealing surface 98, having its apex located on a line parallel with the flow passages of the valve and passing through the point R of the plug member 46. This construction will cause the sealing surface 96 of the plug member 46 to move into substantially direct engagement with the frusto-conical sealing surface 98, as the plug member 46 is turned about its axis A. Since the sealing member 84 will move into substantially direct contact with the sealing surface 98, there will be no appreciable dragging or sliding of the sealing member 84 on the sealing surface 98, thereby virtually eliminating any deterioration of the sealing member 84 by relative movement between the sealing surface 98 and the sealing member 84, after contact has been made.

Figure 5:
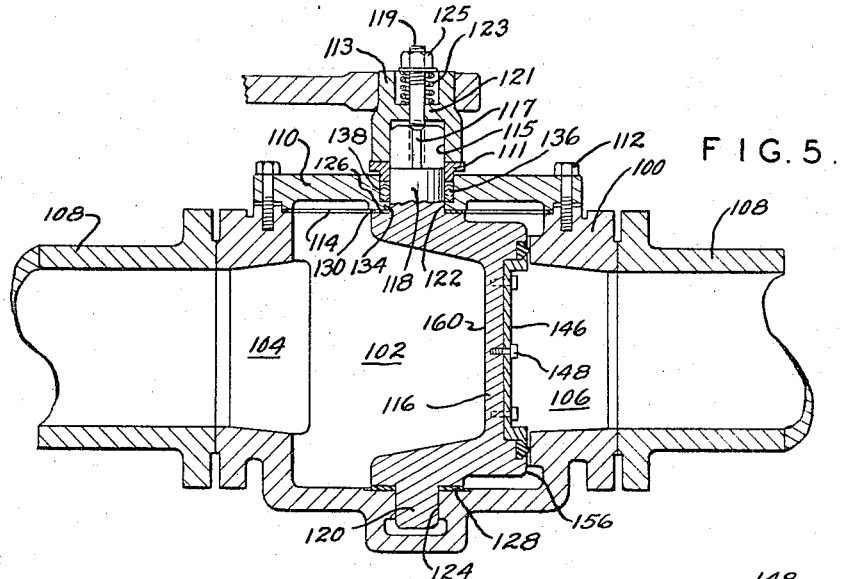
FIGURE 5 is an elevational view in section of a modified embodiment of the invention.

As illustrated in FIGURE 5, a modified form of the invention comprising a valve body having rectangular ports formed therein, incorporates a retained resilient sealing member of generally triangular cross-sectional shape, which is retained within the plug member of the valve. A valve body 100, having a valve chamber 102 formed therein and having rectangular ports 104 and 106 in communication with the valve chamber, is adapted for connection to a pipeline 108. A bonnet 110 is fixed in sealing relation to the valve body 100 by a series of bolts 112, to form a closure for a bonnet opening into the valve chamber. A trunnioned plug member 116 has a pair of aligned trunnion members 118 and 120 formed thereon, which extend through openings 122 and 124 formed respectively in the bonnet 110 and the valve body 100. The plug member 116 is formed with an annular shoulder 126 which is separated from the bonnet by a wear resistant washer 130. A circular boss 134, formed on the bonnet 110 about the opening 122, is formed with a substantially planar surface which is engaged by the wear resistant washer 130.

A packing assembly 136 is disposed in an annular packing chamber 138 formed in the bonnet 110 about the stem opening 122 and is maintained under compression within the packing chamber by a packing retainer 111. A handle structure 113, having a generally rectangular drive opening 115 therein, is fitted about a generally rectangular mating drive portion 117 of the trunnion 118 and is rotatable for imparting rotation to the plug 116. A stud 119 extends through a web portion 121 of the handle structure 113 and is threadedly received in the trunnion 118. A spring 123 is positioned about the stud 119 and is maintained in compression between the web portion 121 and a nut 125. The spring 123 biases the handle structure 113 into engagement with the packing retainer 111, thereby serving to maintain the packing assembly 136 under compression. The packing compression can be adjusted by rotating the nut 125 to adjust the compression of the spring 123.

Figure 6:
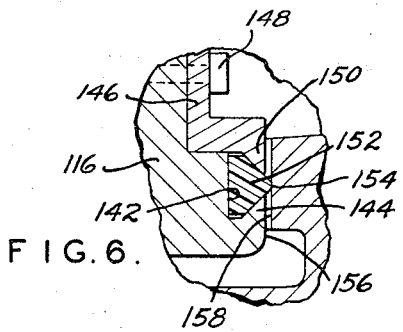
FIGURE 6 is a partial sectional view of the invention of FIGURE 5, illustrating the sealing structure in detail.

As illustrated particularly in FIGURE 6, for the establishment of a seal about a rectangular port of the valve body, the plug member 116 is formed with a generally rectangular surface 142 substantially parallel to the surface 156 of the plug, and includes a generally rectangular lip portion 144. A retainer member 146 is fixed to the plug member 116 by a series of bolts 148, and includes a generally rectangular lip portion 150, which cooperates with the rectangular lip 144 and with the surface 142 to define a seal groove having a generally rectangular restricted opening. A sealing member 152 of generally rectangular shape when viewed in elevation and of generally triangular cross section is locked within the seal groove by the retainer member 146 and maintained under slight compression by the lips 144 and 150. The sealing member 152 has a small curved sealing portion 154 thereof extending through the restricted opening and into position for sealing engagement with a sealing surface 158 formed within the valve body 100.

Figure 7:
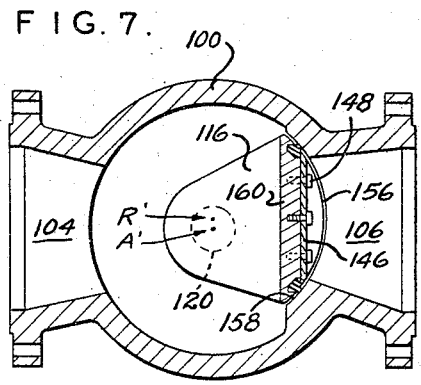
FIGURE 7 is a plan view in section of the invention of FIGURE 5.

As illustrated in FIGURES 5 and 7, the generally rectangular groove has curved upper and lower portions joined by substantially straight and vertical parallel side portions.

As illustrated in FIGURE 7, the plug member 116 is formed with a generally cylindrical sealing surface 156, which is generated by a line swung about the center R', which is positioned eccentrically with respect to the axis A' of the trunnion members 118 and 120. The valve body 100 is formed with a generally cylindrical sealing surface 158 about the rectangular port 106, which is also generated by a line swung through an arc about the eccentric point R'. Since the sealing surfaces of the valve and the sealing face of the plug member 116 are formed eccentrically with respect to the axis of the trunnions 118 and 120, the plug member, on being rotated into engagement with the sealing surfaces of the valve, will move into substantially direct contact therewith, thereby minimizing any tendency of the sealing member to slide upon or be damaged by the sealing surface of the valve. The exposed portion 154 of the sealing member 152, upon being swung into tight engagement with the sealing surface 158, will effect a fluidtight seal between the plug and the sealing surface 158.

As illustrated in detail in FIGURE 6, the inner and outer portions of the sealing member are spaced from the walls of the groove, thereby providing space into which the material of the sealing member 152 may flow in the event that compression between the sealing surface 158 and the sealing member 152 becomes severe, for example, due to high pressure conditions.

Figure 8:
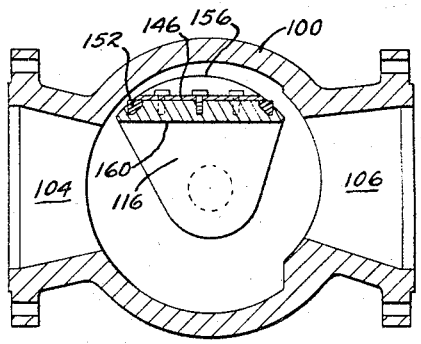
FIGURE 8 is a plan view in section of the invention of FIGURE 5, illustrating the valve in its opening condition.

As illustrated in FIGURE 8, the sealing member will be positioned out of the flow path of the fluid when the valve is rotated to its open position, thereby protecting the sealing member from damage which might occur if the fluid is abrasive in nature. A rear substantially planar surface 160 of the plug 116 serves to guide the flow of lading from the inlet port to the outlet port and tends to prevent turbulence from setting up in the valve which might cause erosion of the sealing member 152. The sealing member 152 may be replaced easily by removing the plug member from the valve through the bonnet opening 114 and removing the retainer member 146. Replacement of the sealing member 152 may be accomplished very easily without requiring removal of the valve from the line. Since only the sealing member need be replaced, the repair operation will be quite inexpensive.

Figure 9:
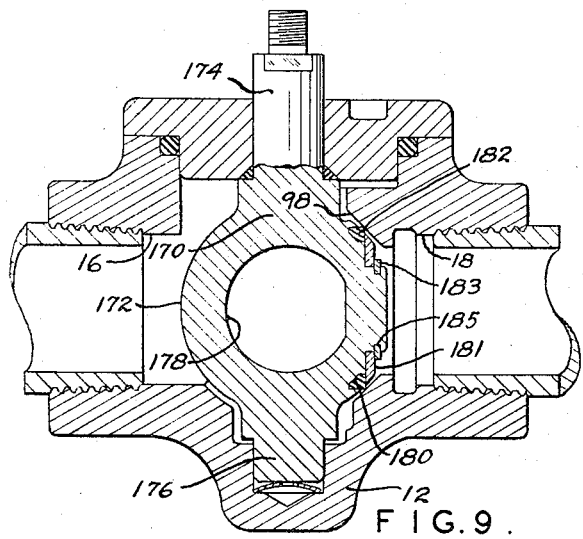
FIGURE 9 is a partial elevational view in section of a further modified form of the invention.

A modified form of the invention for high pressure service is illustrated in FIGURE 9, and includes a generally spherical eccentric plug member 170, positioned within a valve body identical in construction and operation to the valve body 12, illustrated in FIGURES 1 and 2. The generally spherical surface 172 is generated by a radius which is eccentrically positioned with respect to the axis of the trunnions 174 and 176, thereby causing the spherical portion of the plug 170 to be rotated in the same eccentric manner as the sealing surface 68 of the valve illustrated in FIGURES 1, 2 and 3 is rotated. The plug member 170 is formed with a centrally located bore 178, which is substantially aligned with the flow passages 16 and 18 in the valve body 12 to guide the fluid through the valve and to prevent the occurrence of turbulence within the valve in the open position thereof. The plug 170, being spherical, is extremely rigid, which prevents excessive distortion of the plug under high pressure. The plug member 170 is formed with an annular groove 180 and is provided with an annular retainer member 181 which cooperates with the groove to define a restricted groove opening. A sealing member 182 is disposed within the groove 180 and has a portion thereof extending through the restricted opening for sealing engagement with the generally frusto-conical surface 98 on the valve body 12. The sealing assembly, including the sealing member 82 and the retainer ring 180, upon being moved to the open condition thereof, is positioned out of the path of direct flow, thereby eliminating the possibility of erosion of the sealing member 182 by the lading. The sealing member 182, upon rotation of the valve into the closed position thereof, will rotate eccentrically into substantially direct contact with the frusto-conical seat surface 98 of the valve body 12. The plug-sealing surface relationship of the invention effectively alleviates any great tendency of the sealing member to become worn due to dragging of the sealing member on the sealing surface of the valve. Due to the novel construction of the plug structure, the sealing member may be easily replaced if it should become worn.

As illustrated in FIGURE 9, a spring lock washer 183 may be fitted within a lock groove 185 formed in the plug 170, in such a manner that it prevents the retainer member 181 from becoming disassembled from the plug. When replacement of the sealing member 182 is required, it is merely necessary to remove the spring washer 183 and retainer and sealing member may then be easily disassembled from the plug.

The sealing member of each of the various embodiments disclosed is pressure actuated by the fluid controlled by the valve and accordingly the magnitude of the seal developed between the plug and the valve body will vary directly with the pressure within the valve. The pressurized fluid attempting to bypass the sealing member will force the sealing member toward the outer periphery of the seal groove and will cause the rounded sealing portion of the sealing member (96 as viewed in FIGURE 4) to be moved into tighter sealing engagement with the sealing surface of the valve. Therefore, as the pressure of the fluid increases or decreases, there is a directly proportional increase or decrease in the sealing ability of the valve.

In view of the foregoing, it is apparent that I have produced an eccentric plug valve having sealing members which are movable to a protected position within the valve, during the open condition of the valve, to prevent undue wear of the sealing members by the erosive action of the fluid. The valve of this invention incorporates sealing members which are positively retained within a groove by a retainer member to prevent the sealing members from being forced from the groove by pressure. It is further apparent that I have produced a valve having no areas for the deposit of solid material from slurry ladings, thereby providing a valve which is capable of continued satisfactory slurry service. The specific construction of the plug member of the valve makes the valve easily adaptable to varied service conditions. The sealing members of the valve may be easily replaced without involving the replacement of the entire plug assembly and without removal of the valve from the line. It is, therefore, seen that this invention is one well adapted to attain all of the objects hereinabove set forth, together with other advantages which are obvious and inherent from the description of the apparatus itself.

It will be understood that certain features and subcombinations are of utility and may be employed without reference to other features and subcombinations. This is contemplated by and is within the scope of the claims. As many possible embodiments may be made of the invention without departing from the scope thereof, it is to be understood that all matter hereinabove set forth or shown in the accompanying drawings is to be interpreted as illustrative and not in a limiting sense.

I claim:

1. An eccentric plug valve having a body forming a valve chamber and having inlet and outlet passages in communication with the valve chamber, said body having a seat surface formed about at least one of said passages, a plug member having aligned trunnions journaled in bearing apertures in the body and being rotatable within the valve chamber between open and closed positions, said trunnions being journaled in eccentric relation with said seat surface, means on one of said trunnions for imparting rotation to the plug member, said plug having a partially spherical surface thereon, said trunnions being journaled centrally of the valve chamber and said partially spherical sealing surface being generated eccentrically relative to said trunnions, said seat surface being generated about the same point of eccentricity as said sealing surface, means defining an annular groove having a restricted opening in said partially spherical surface, resilient sealing means disposed within said groove and having a sealing portion thereof extending beyond said surface, means for retaining said sealing means within said groove, said sealing means upon rotation of said plug to its closed position being movable eccentrically into sealing contact with said seat surface.

2. A plug valve as recited in claim 1, said groove having a frusto-conical wall bounded on one side by a cylindrical wall and on the other side by a radial wall, and having a cylindrical wall cooperating with said plug surface to define a first annular lip, a retainer member on said plug defining a second annular lip which cooperates with said first annular lip to define said restricted opening.

3. A plug valve as set forth in claim 1, said means defining said annular groove comprising an annular recess formed in said plug and an annular retainer member fixed to the plug overlying a portion of said recess and defining said restricted opening.

4. A plug valve as set forth in claim 3, a portion of said plug member being formed to positively lock the retainer to the plug member.

5. A plug valve as recited in claim 4, the cross-sectional shape of said sealing member being generally complimentary to the shape of said groove and being retained within said groove by said first and second lips, said sealing member having side walls in spaced relation with the side walls of said groove, said sealing portion of said sealing means extending through said restricted opening for sealing engagement with said seat surface.

6. A valve for controlling the flow of a fluid medium comprising a valve body defining a valve chamber and having inlet and outlet passages in communication with the valve chamber, a seat surface formed about one of said passages and being disposed in eccentric relation with respect to said valve chamber, a bonnet removably fixed to said body and forming a closure for the valve chamber, aligned bores formed in the valve body and the bonnet, a plug member having a pair of trunnions formed in coaxial relation thereon, said plug member having a partially spherical surface thereon generated eccentrically with respect to said trunnions about the same point as said seat surface, one of said trunnions extending into the valve body bore and the other of said trunnions extending through said bonnet bore, means on said other of said trunnions for imparting rotation to said plug member, means forming a seal between the bonnet and said other of said trunnions, an annular groove formed in said plug member and intersecting said partially spherical surface, an annular sealing member disposed within said groove and adapted for sealing engagement with said seat surface in the closed position of said plug member, a retainer member fixed to said plug member and cooperating with said groove to define a restricted groove opening, a portion of said sealing member protruding through said restricted opening for sealing engagement with said seat surface.

7. A valve as set forth in claim 6, a portion of said plug member being formed about said retainer member to positively lock said retainer means to said plug member.

8. A valve as set forth in claim 6, said groove having a substantially planar bottom wall bounded by side walls, a first lip formed on said plug and a second lip formed on said retainer, said first and second lips cooperating to define said restricted opening, said sealing member being generally complementary to said groove and being positively retained within said groove by said first and second lips, said sealing member having side walls in spaced relation with the side walls of said groove.

References Cited
UNITED STATES PATENTS

| | | | |
|---|---|---|---|
| 2,574,428 | 11/1951 | Wheatley | 251—316 X |
| 2,870,987 | 1/1959 | Greenwood | 251—328 X |
| 2,941,779 | 6/1960 | Saar | 251—175 |
| 2,945,669 | 7/1960 | Gallagher | 251—309 |
| 3,035,811 | 5/1962 | Hamer | 251—317 |
| 3,064,940 | 11/1962 | Anderson | 251—309 X |
| 3,079,124 | 2/1963 | Fawkes | 251—317 |
| 3,109,623 | 11/1963 | Bryant | 251—172 |
| 3,155,368 | 11/1964 | Shafer | 251—172 |
| 3,169,547 | 2/1965 | Pearl | 137—505.42 |
| 3,170,669 | 2/1965 | Roos | 251—160 |
| 3,192,948 | 7/1965 | Anderson | 137—454.6 |

WILLIAM F. O'DEA, *Primary Examiner.*

H. WEAKLEY, *Examiner.*